United States Patent
Leonard

(10) Patent No.: US 6,305,528 B1
(45) Date of Patent: Oct. 23, 2001

(54) APPARATUS AND METHOD FOR ADJUSTING THE POSITION OF GUIDE RAILS IN CONVEYORS

(75) Inventor: Michael T. Leonard, Petaluma, CA (US)

(73) Assignee: Flow Engineering, Petaluma, CA (US)

(*) Notice: Subject to any disclaimer, the term of this patent is extended or adjusted under 35 U.S.C. 154(b) by 0 days.

(21) Appl. No.: 09/491,837

(22) Filed: Jan. 26, 2000

(51) Int. Cl.⁷ .................................................. B65G 21/20
(52) U.S. Cl. ........................................................ 198/836.3
(58) Field of Search .............................. 198/836.1, 836.3

(56) References Cited

U.S. PATENT DOCUMENTS

| | | |
|---|---|---|
| 2,156,020 | 4/1939 | Lathrop . |
| 3,527,336 | 9/1970 | Johnston . |
| 3,628,647 | 12/1971 | Beard . |
| 4,216,855 * | 8/1980 | Raudat .................... 198/836.3 X |
| 5,211,280 | 5/1993 | Houde . |
| 5,291,988 | 3/1994 | Leonard . |
| 5,322,160 | 6/1994 | Markiewicz et al. . |
| 5,421,678 | 6/1995 | Aidlin et al. . |
| 5,706,933 * | 1/1998 | Ovellette .................... 198/836.3 |
| 5,782,339 | 7/1998 | Drewitz . |
| 5,927,480 | 7/1999 | McCaffrey et al. . |
| 5,967,295 | 10/1999 | Ledingham . |
| 6,152,293 * | 11/2000 | Ballos, III .................... 198/836.3 |

* cited by examiner

Primary Examiner—James R. Bidwell
(74) Attorney, Agent, or Firm—John P. O'Banion

(57) ABSTRACT

A system for remote adjusting of guide rail positions along a conveyor. The guide rails are adjusted to allow the conveyor to accommodate product packages of various shapes and sizes. A moveable guide rail assembly is positioned along a conveyor and is in mechanical connection with the piston rod of an actuator cylinder. A guide rail control device is fluidly connected with the actuator cylinder and it translates a mechanical input to a fluidic output that is communicated with the piston of the actuator cylinder to thereby move the guide rail assembly into a new adjustment position. The system can provide simultaneous adjustment of numerous guard rail segments from a remote guide rail control device while providing accurate non-drift infinitely-adjustable positioning.

24 Claims, 8 Drawing Sheets

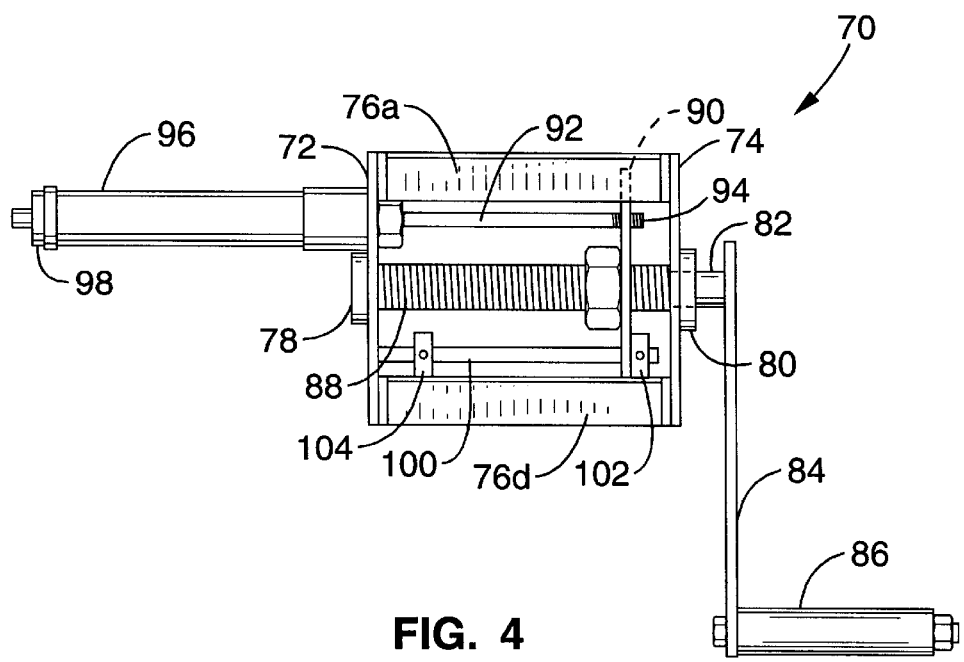
FIG. 4
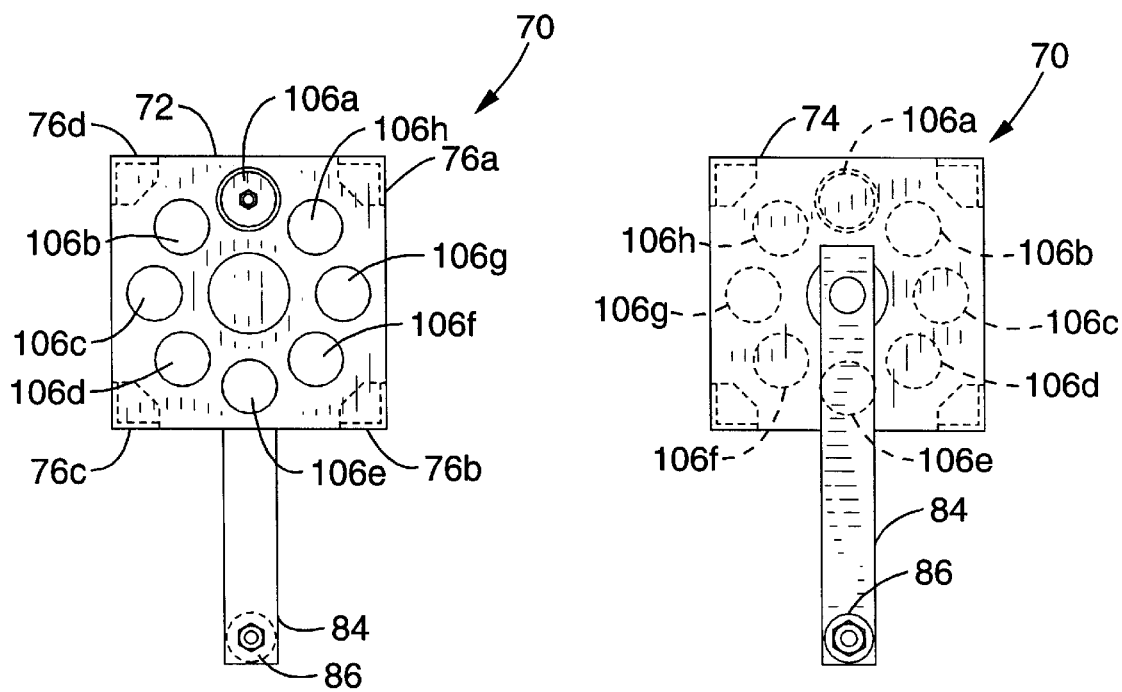
FIG. 5
FIG. 6

APPARATUS AND METHOD FOR ADJUSTING THE POSITION OF GUIDE RAILS IN CONVEYORS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention pertains generally to industrial conveyor systems, and more particularly to an adjustable guide rail system for use with industrial conveyor systems.

2. Description of the Background Art

Conveyors are used in numerous industrial plants for moving product packages from one processing station to the next. For example, a conveyor system may be used to move a liquid container through a packaging line where it is cleaned, filled, capped, labeled, coded, weighed, and packed. To make efficient use of expensive investments in machinery and resources, industrial plants generally run batches of different products. Because these products may be of different sizes and shapes, the guide rails of the conveyor system often needs to be adjusted between product batches.

Currently, guide rail adjustment is a time consuming process. On conveyor lines where manually adjustable brackets are used, each bracket along the conveyor line must be individually adjusted for a new batch of items being moved. In general, adjusting one of these manually adjustable brackets involves loosening a locking device, moving the guide rail to the desired position, and tightening the locking device. This adjustment process is repeated for every guide rail support on each side of the conveyor along its length. When working with multi-lane conveyors, it is often difficult for plant personnel to access the manually adjustable bracket for inner lane guide rails. Manufacturers have looked for various solutions to overcome the time wasted on these adjustments; however a simple, economical, and low-complexity solution that allows for rail adjustment across a range of package sizes has been elusive. Manufacturers have therefore largely retained the use of manual guide rails.

As can be seen therefore, the development of an inexpensive, fully adjustable, guide rail would reduce the setup time required between product batches within many industrial plants in which products are moved along a conveyor system. The adjustable guide rail in accordance with the present invention satisfies that need, as well as others, and overcomes deficiencies in previously known guide rail adjustment methods.

BRIEF SUMMARY OF THE INVENTION

The present invention is an adjustable guide rail system which provides a simple and inexpensive means of simultaneously and remotely adjusting the position of numerous guide rails. By way of example, and not of limitation, the guide rail system of the present invention comprises a multiple cylinder hydraulic control device coupled with a set of guide rail actuators. The hydraulic control device has a crank handle that, when turned, moves the plungers on a series of pistons to simultaneously displace fluid which is communicated to induce movement within a series of actuators coupled to the guide rail sections which thereby move to a new position.

An object of the invention is to provide a low cost device for adjusting the position of a conveyor guide rail.

Another object of the invention is to provide an adjustment device which retains its position without additional locking devices.

Another object of the invention is to provide an adjustment device in which a series of guide rails are controlled from a single location.

Another object of the invention is to provide an adjustment device wherein the guide rail may be adjusted to intermediate positions between a minimum and maximum setting.

Another object of the invention is to provide accurate guide rail positioning.

Another object of the invention is to provide for a self-contained adjustable guide rail system.

Another object of the invention is to provide an adjustment device that is reliable and easy to maintain.

Another object of the invention is to provide a guide rail adjustment system that can be adapted for use in multi-lane conveyors.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is a top view of an open-frame guide rail control assembly according to the present invention.

FIG. 5 is an end view of the guide rail control assembly of FIG. 4, shown from actuation cylinder side.

FIG. 6 is an end view of the guide rail control assembly of FIG. 4, shown from the crank handle side.

DETAILED DESCRIPTION OF THE INVENTION

Referring more specifically to the drawings for illustrative purposes, the present invention is embodied in the apparatus generally shown in FIG. 1 through FIG. 10. It will be appreciated that the apparatus may vary as to configuration and as to details of the parts without departing from the basic concepts as disclosed herein.

Figure 1:
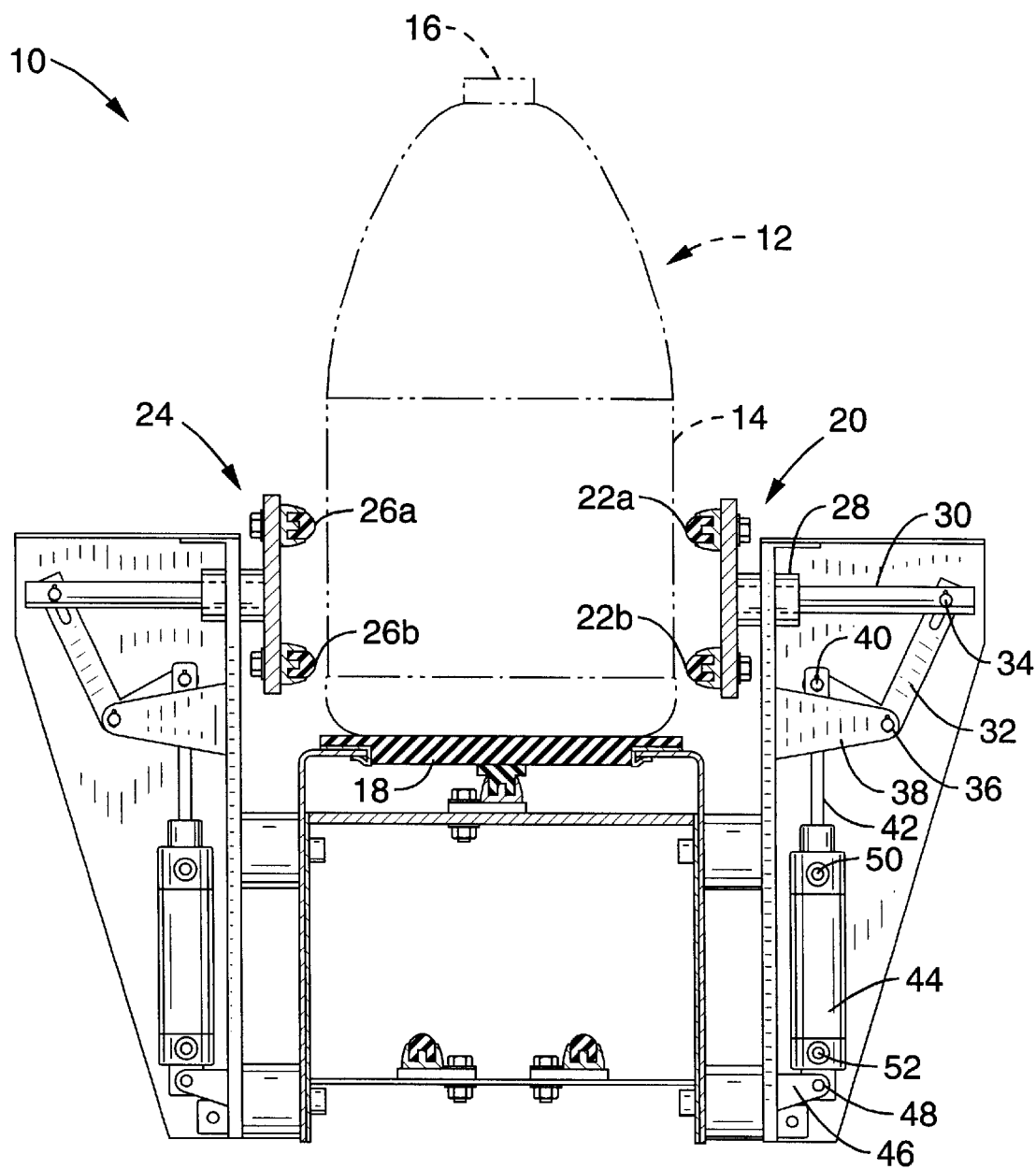
FIG. 1 is an end view of an adjustable guide rail actuator system according to the present invention positioned in relation to guide rails and a conveyor which are shown in partial cross-section.

FIG. 1 shows the actuators of an embodiment of an adjustable guide rail system 10 according to the invention guiding a product bottle 12 (shown in phantom). The product bottle 12 has sides 14 and a top 16, and is shown resting on top of a moving conveyor system 18. Also shown is a right side guide rail assembly 20 comprising a top rail 22a and a bottom rail 22b, as well as a similar left side guide rail assembly 24 comprising a top rail 26a and a bottom rail 26b. Mounted in a fixed relationship to the conveyor is an actuator sleeve 28 through a guide extension rod 30 slidably extends. A lever 32 is pivotally connected to one end of the guide extension rod 30 by means of a clevis 34. The lever 32 is also pivotally connected by a clevis 36 to a lever support 38. The lever 32 rotates in response to movements of the piston rod 42 of an actuator 44 attached to the opposing end of the lever 32 by a clevis 40. The actuator is preferably a hydraulic actuator cylinder attached to a support bracket 46 with a clevis 48. The actuator is controlled by means of fluid communication with an upper actuator input 50 and a lower actuator input 52.

Figure 2:
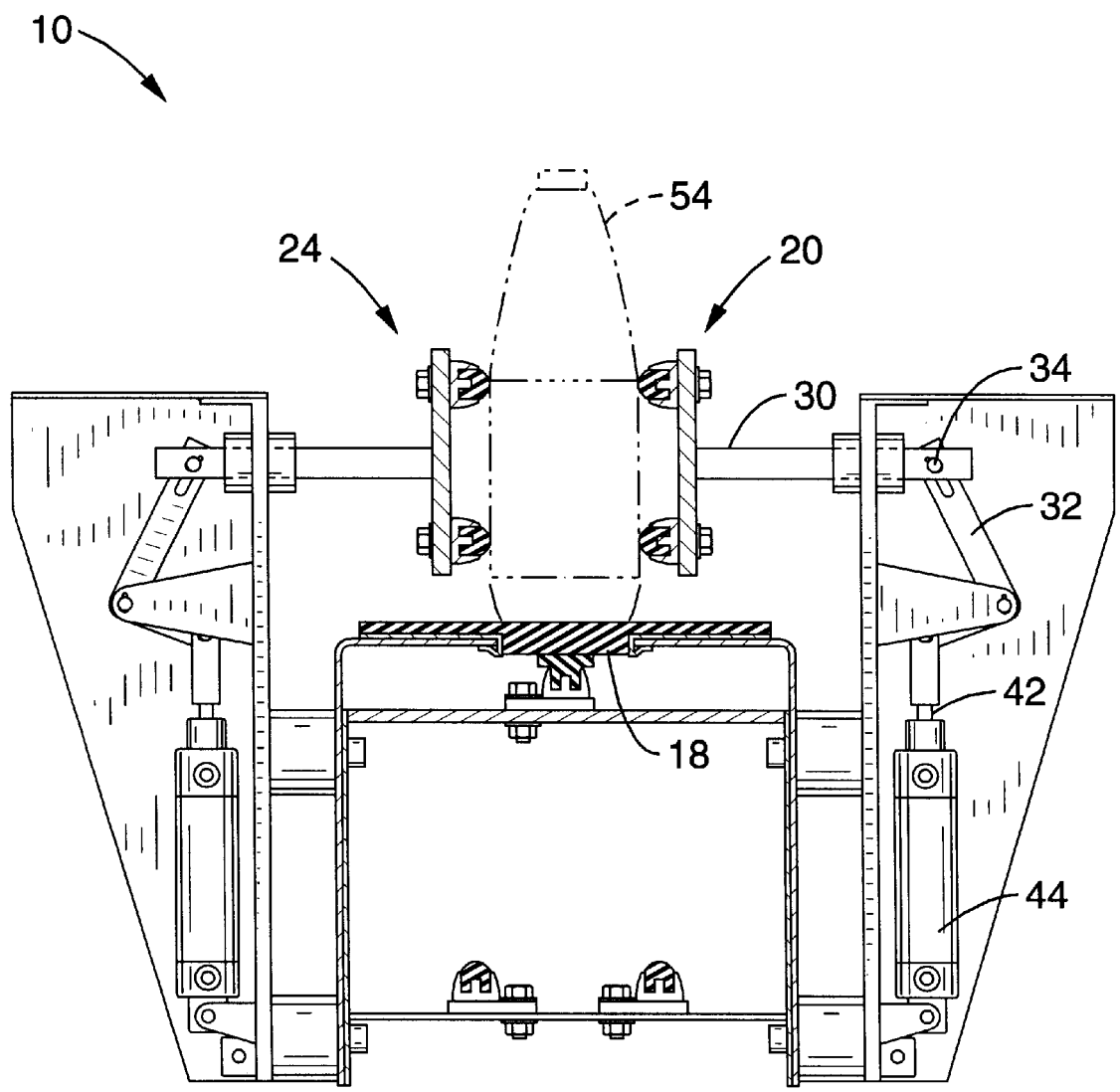
FIG. 2 is an end view of the guide rail actuator system of FIG. 1 showing the guide rails adjusted for a smaller sized package.
Figure 3:
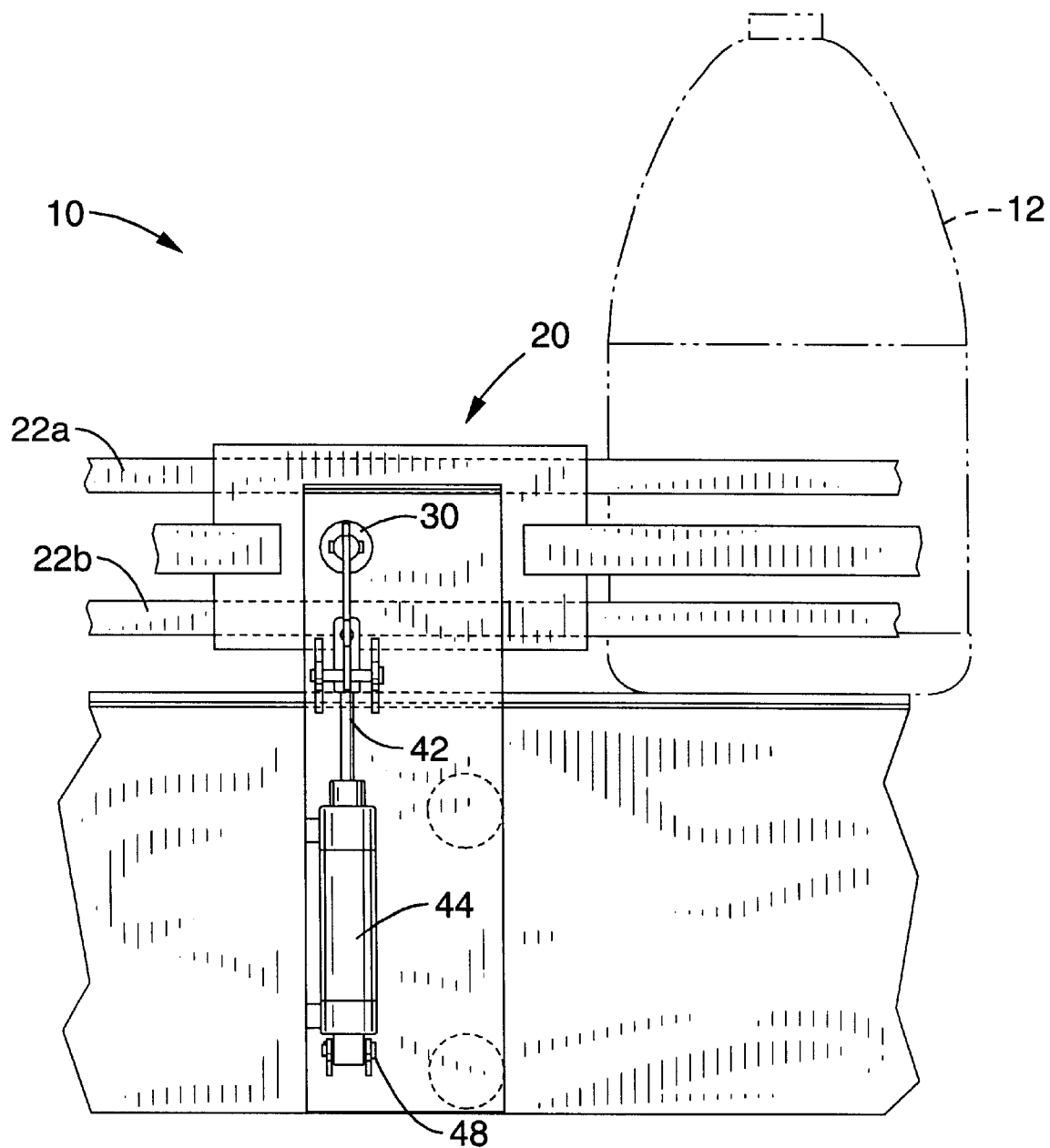
FIG. 3 is a side view of the guide rail actuator system of FIG. 1.

FIG. 2 shows the guide rail for the conveyor adjusted for a product package 54 (shown in phantom) which is smaller than the package 12 shown in FIG. 1. The right 20 and left 24 guide assemblies are extended to guide the package 54 along the conveyor. The right side guide extension rod 30 is shown nearly fully extended as a result of lever 32 being moved by actuator cylinder 44 which is retracted. A side view of the adjustable guide rail system guiding a large container package 12 along the conveyer is shown in FIG. 3.

Referring now to FIG. 4, an embodiment of guide rail control device 70 according to the invention is shown. The control device 70 exemplified in this figure has an open frame housing which comprises a first plate 72, a second plate 74 and an interposing set of four corners 76a–d which define the edges of the housing. A first bushing 78 on the first plate 72 and a second bushing 80 on the second plate 74 retain a crankshaft 82 onto which are connected a crank lever arm 84 and a crank handle 86. The crankshaft 82 has a threaded portion 88, preferably using acme-type threads, upon which a control plate 90 is threadably disposed. The control plate 90 is shown herein as a plate with a welded nut. It can be seen that rotation of the crank lever arm 84 by means of the handle 86 forces the control plate 90 to move along the threaded crankshaft portion 88 in a direction that depends on the direction of crank rotation. A piston rod 92 with a threaded end 94 is threadably engaged with the control plate 90. Movements of the control plate 90 force the extension or retraction of piston rod 92. Piston rod 92 slides within control cylinder 96, and a fluid connection port 98 on control cylinder 96 provides fluidic communication with an actuator, such as the actuator cylinder 44 shown in FIG. 1. For the sake of clarity, a single control cylinder is depicted in FIG. 4, whereas typically a plurality of such control cylinders would be attached to the guide rail control device 70. The control device 70 additionally comprises a limit setting arm 100 upon which are annularly disposed collars forming a wide limit stop 102 and a narrow limit stop 104. The limit stops 102, 104 can be locked, preferably by set-screws, onto the limit setting arm in positions to prevent the control device from being set overly wide or narrow for the specific conveyor in use. A rear view of the control cylinder side of the control device 70 is shown in FIG. 5. Additional cylinder mounting holes 106b–h indicate positions on this particular control device where additional control cylinders can be attached. FIG. 6 shows a front view of the crank handle side of the control device 70.

Figure 7:
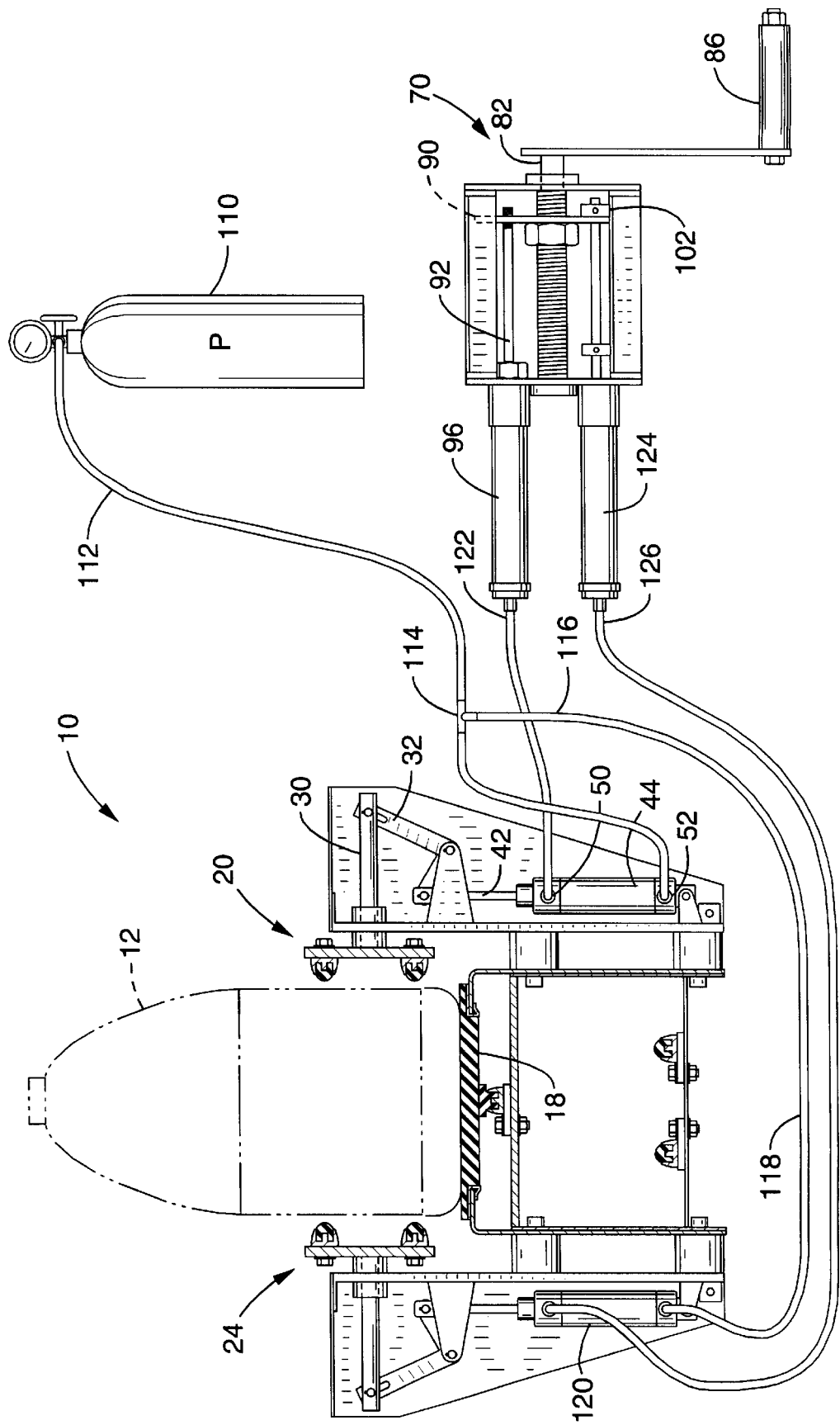
FIG. 7 is a schematic diagram showing hose connections between the control assembly of FIG. 4, a gas source, and the pair of guide rail actuators shown in FIG. 1.

FIG. 7 shows fluidic connections between the guide rail actuators 10, the control device 70, and a pressurized gas source 110. The guide rails 20, 24 in FIG. 7 are shown in a fully open (wide) position. Pressurized gas from a source 110 is supplied via a hose 112 which splits off at a "T"-fitting 114 to a first gas hose 116 and second gas hose 118 to supply a biasing pressure to the actuation cylinders 44 and 120. Counter-clockwise rotation of crank handle 86 and crankshaft 82 moves the control plate 90 away from the maximum width stop 102 while forcing retraction of piston rod 92 into control cylinder 96. As the piston rod 92 moves the cylinder's internal piston, fluid is displaced from the cylinder chamber through first pressure hose 122 into the upper port 50 of the first actuator cylinder 44 which causes piston rod 42 of the actuator 44 to retract in response. Movement of piston rod 42 is translated by lever 32 to move guide extension rod 30 and the attached guide rail 20 toward the center of the conveyor 18, the movement being mirrored by guide rail 24 driven by actuator 120. Continued counter-clockwise rotation of the handle 86 causes continued movement of the guide rails 20,24 toward one another. A second control cylinder 124 in FIG. 7 is coupled to the same control plate 90 to provide simultaneous control of the second actuation cylinder 120 through a second pressure hose 126. Although a single pair of control cylinders 96,124 are shown in FIG. 7, it should be recognized that this system can accommodate a large number of control cylinders.

Figure 8:
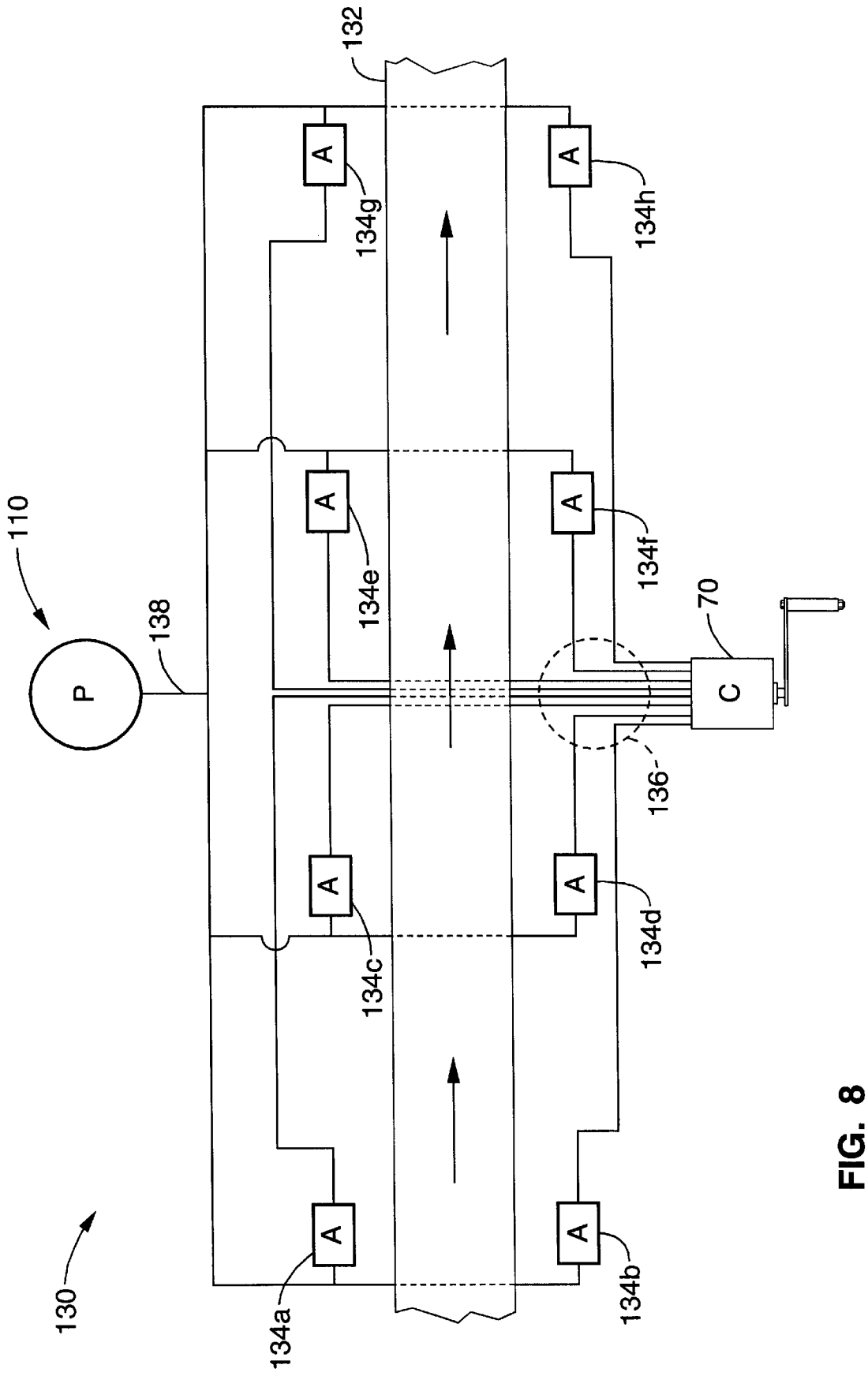
FIG. 8 is a schematic diagram of a guide rail adjustment system according to the invention wherein eight actuator positions are shown connected to a guide rail control assembly.

FIG. 8 is a schematic diagram shown an example of a typical installation 130 of the adjustable guide rails on a conveyor line. A conveyor 132 is shown in which a total of eight guide rail adjusters 134a–h are used. Guide rail control device 70 contains a series of control cylinders as described above (not shown) from which a series of hoses 136 are routed to each guide rail actuator 134a–h. A bias force to each actuator is supplied via a common gas pressure hose 138 from the gas pressure source 110. It can seen from this diagram that it is possible to quickly change the guide rail position for an entire assembly line with a few turns of the handle on the guide rail control device.

The embodiment described by FIG. 1 through FIG. 8 is preferably used with a 30–40 psi air system as the source of gas pressure biasing and a food grade hydraulic oil used for driving the pistons. Tests performed on the system produce rail positioning repeatability of +/−0.020 inches which exceeds accuracy requirements for the industry, since production systems considered to require highly accurate guide rail positioning typically operate with adjustment tolerances of +/−0.0625 inches.

It should be recognized that the present invention exemplified by the described embodiment provides a means for simultaneously adjusting a series of guide rails from a remote position. The ability to remotely adjust a guide rail provides for more rapid setup of a conveyor while it eliminates the need to gain physical access to adjustment brackets of inner lanes of a conveyor. Simultaneous adjustment of a series of guide rails along a single lane conveyor was previously described in regards to FIG. 8. An example of operator adjustment of the guide rails on a conveyor are as follows:

1. CHECK LINE—Operator checks conveyor line for obstructions.
2. TURN HANDLE—Operator turns handle counter-clockwise=narrower;
clockwise=wider.
3. SET POSITION—Operator adjusts until indicator reaches desired position.

The described use of a combination gas/fluid control and actuation means is the preferred method of implementing the invention; however other methods, which may provide varying levels of success, can alternatively be employed. For example, the gas pressure biasing force can be replaced with a mechanical biasing means, such as springs, which operate against the force of the actuation piston being moved by fluidic pressure from a control cylinder.

Figure 9:
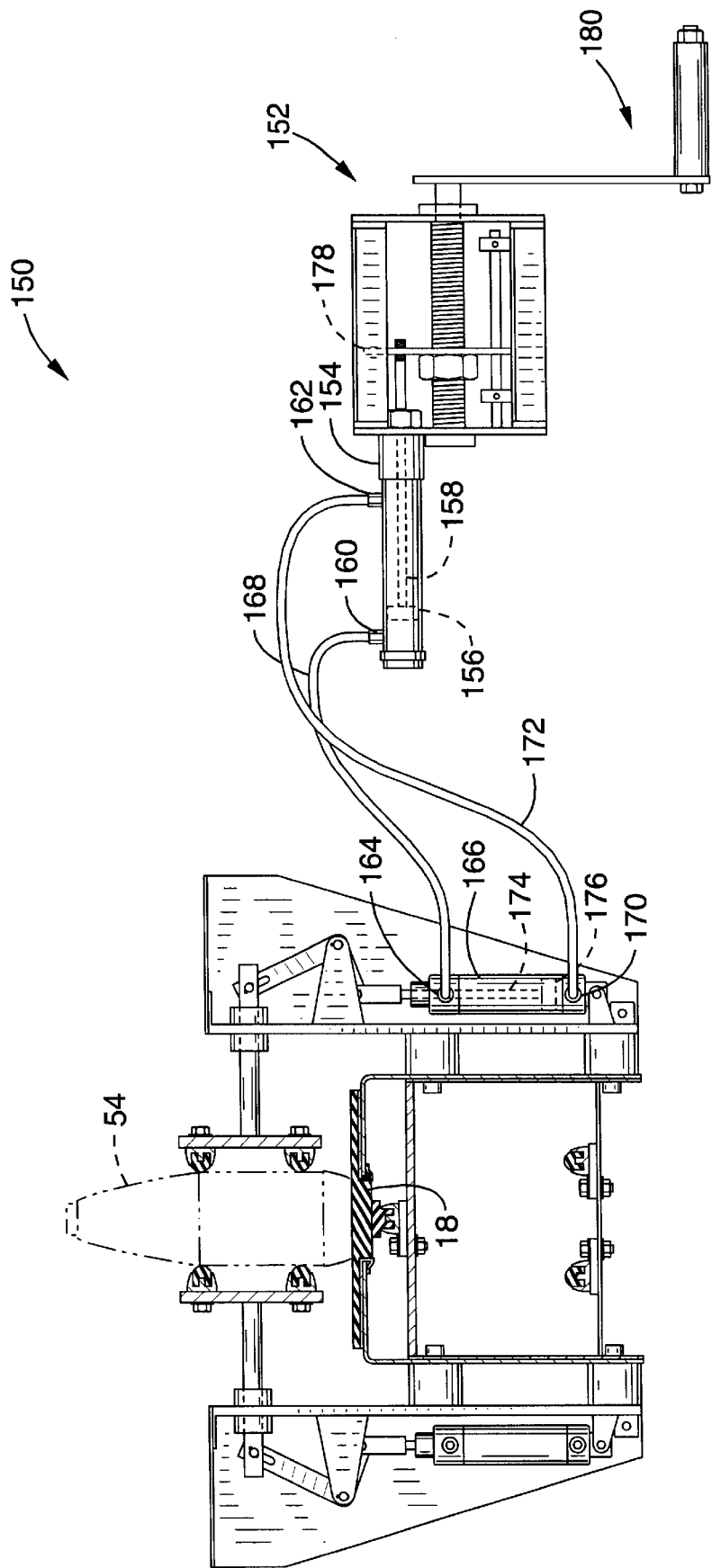
FIG. 9 is a schematic diagram of an alternative embodiment of the adjustable guide rail system of FIG. 7 using a master/slave cylinder coupling instead of a gas source.

Another embodiment of the adjustable guide rail system 150 is shown in FIG. 9 where a master/slave cylinder coupling is used instead of a separate pressurized gas source. This embodiment of a guide rail control device 152 has a control cylinder 154 whose piston 156 and rod 158 provide fluidic communication with two ports 160,162. A first port 160 of control cylinder 154 is connected to the second port 164 of a first actuation cylinder 166 by hose 168, while the second port 162 of control cylinder 154 is similarly coupled to the first port 170 of the first actuation cylinder 166, by hose 172. The piston rod 174 and piston 176 of the first actuation cylinder 166 has been substantially retracted as the control plate 178 has been advanced by counter-clockwise rotation of the crank 180. Counter-clockwise crank rotation forces retraction of the piston rod 158 with piston 156 deeper into the cylinder, thereby forcing fluid through port 160 into the upper port 164 of the first actuation cylinder while drawing fluid from the lower port 170 of the actuation cylinder 166 which is drawn into port 162 of the control cylinder. Movement of the crank handle in the clockwise direction causes a corresponding reversal of the fluid directions, therefore moving the piston 176 of the actuation cylinder 166 in the opposite direction.

Figure 10:
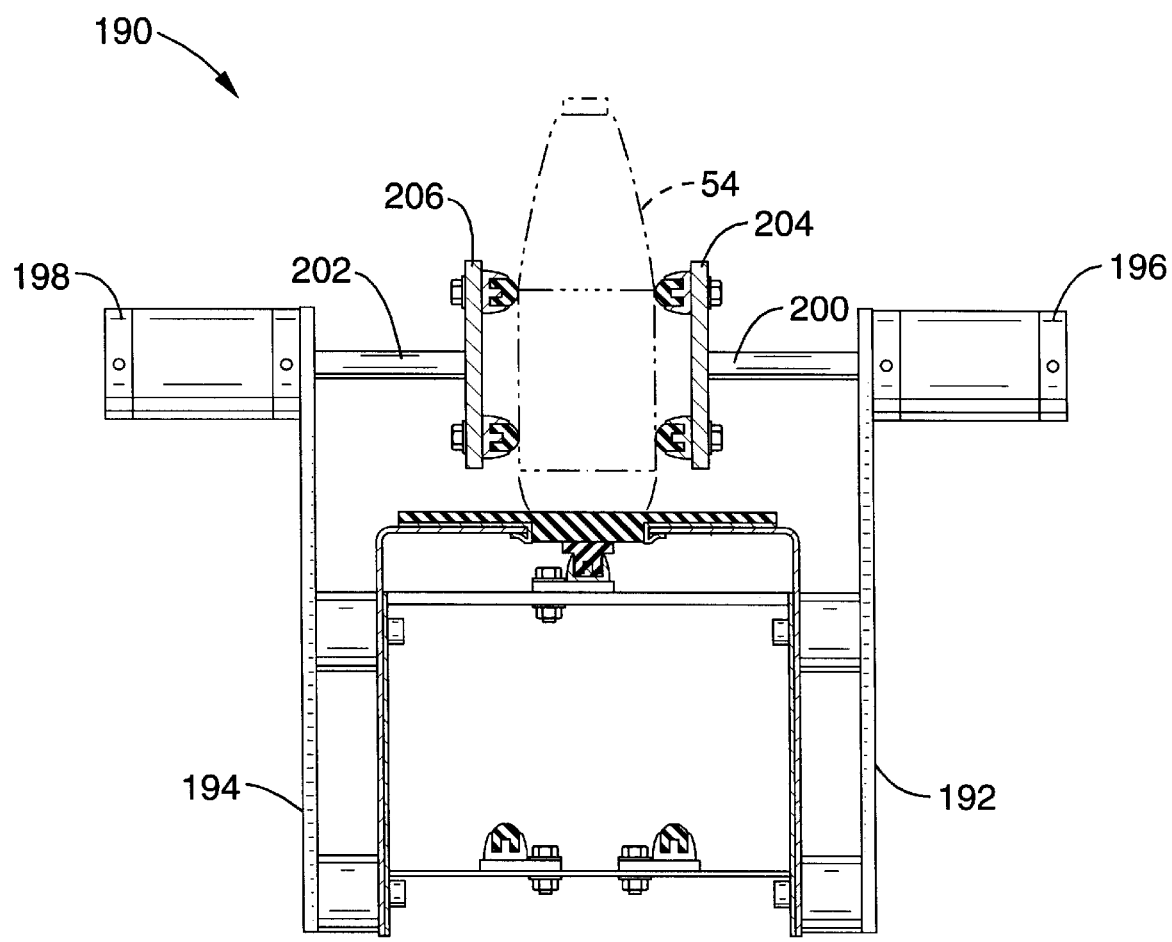
FIG. 10 is a plan view of an alternative embodiment of the guide rail system of the present invention which uses directly coupled actuators.

FIG. 10 shows an embodiment 190 of the invention which employs directly mounted actuators oriented horizontally rather than vertically as previously described. Vertical supports 192, 194 are provided along the sides of the conveyor to which are mounted actuation cylinders 196,198. The piston rod of these cylinders 202, 204, is directly connected to the guide rail assemblies 204, 206. These hydraulic actuation cylinders are connected to the guide rail control device and respond to fluid communication from the control device in the same manner as the previously described actuation cylinders.

As can be seen, the adjustable guide rail system of the present invention provides a simple system for adjusting the guide rails of a conveyor. It will be appreciated that the invention can be implemented in a variety of ways without departing from the inventive principles. For example, the mechanics of the actuating mechanisms can be varied to use rotating arms, instead of slidable rods, while various forms of hydraulic actuators and control elements may be substituted. The coupling mechanisms between the actuator cylinder and the guide rail assembly may additionally be configured to provide differential guide rail movements, or reversing movements, in response to control device adjustments. These non-linear movements may be desired along a conveyor to adjust side to side product positioning in response to batch setting changes.

It should also be recognized, that although the preferable manual input to the guide rail control device is described, a variety of motor drive units could be coupled to the guide rail control device to replace or augment the use of the manual input.

Accordingly, it will be seen that this invention can be implemented in a variety of ways to position conveyor guard rails and related mechanisms. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for remotely adjusting the position of a conveyor guide rail to accommodate product packages of various shapes and sizes, comprising:
   (a) an actuator cylinder having a piston configured for mechanical connection with a guide rail assembly; and
   (b) a control device that translates a mechanical input into a fluidic output which is communicated with the piston of the actuator cylinder for moving the guide rail assembly from a first position to a second position.

2. An apparatus as recited in claim 1, wherein the control device comprises at least one control cylinder that is in fluid communication with said actuator cylinder, and a mechanical input mechanism whose movements are translated to piston movements within the control cylinder that are fluidly communicated to the actuation cylinder.

3. A system as recited in claim 1, further comprising a piston rod attached to the piston of the actuation cylinder, said piston rod configured for direct attachment to a guide rail assembly for urging a guide rail from a first position to a second position.

4. A system as recited in claim 1, further comprising a guide rail assembly attached to a rod that is slidably engaged within a sleeve such that as the rod slidably moves within the sleeve, the guide rail assembly is urged from a first position to a second position.

5. A system as recited in claim 1, further comprising a lever configured to mechanically couple the movements of the actuator cylinder to a guide rail assembly.

6. A system as recited in claim 4, further comprising a pivoting lever arm configured for attachment between a moveable portion of a guide rail assembly and a piston rod connected with the piston of the actuation cylinder such that movements of the piston within the actuation cylinder are translated by the lever to an adjusting movement of the conveyor guide rail.

7. A system as recited in claim 1, further comprising a bias force operable on said piston of said actuation cylinder.

8. A system as recited in claim 6, wherein the bias force is provided by pressurized gas fluidly communicated with said actuation cylinder.

9. A system as recited in claim 1, wherein the piston within the actuator cylinder is acted upon by a liquid fluid on one side and a pressurized gas on the opposing side of the piston.

10. A system as recited in claim 2, wherein the control device comprises a plurality of control cylinders, each said control cylinder having a piston that moves within its respective cylinder substantially in unison with any additional control cylinders therein.

11. A system as recited in claim 10, further comprising a settable piston control adjustment for moving and holding the piston position of control cylinders within the control device.

12. A system as recited in claim 11, wherein a rotatable crank translates rotational movement into a linear movement of the piston within the control cylinder.

13. A system as recited in claim 12, wherein the rotatable crank is connected with a rotatable threaded crankshaft in threaded connection with an annularly disposed threaded control plate which is connected to the piston rods of said control cylinders, such that rotation of the rotatable crank causes a corresponding rotation of the threaded crankshaft which moves the annularly disposed threaded control plate assembly and displaces the piston rods of said control cylinders.

14. A system as recited in claim 13, further comprising a conveyor guide rail position limiting device which restricts the movement of the control plate and thereby sets minimum width and maximum width positions of a guide rail assembly.

15. A system as recited in claim 14, wherein the position limiting device comprises a support member with at least one adjustable limit stop which mechanically limits the movement of the control plate and thereby restricts the range of positions over which the guide rail may be adjusted.

16. A system as recited in claim 1, wherein fluidic communication occurs between two ports of each control cylinder and two ports of each actuation cylinder, respectively, wherein the actuation cylinder thereby moves in reaction to the movements of the control cylinder.

17. An apparatus as recited in claim 1, wherein the control device comprises:
   (a) a housing;
   (b) a crankshaft rotatably retained within said housing, said crankshaft including a portion having exterior threads;
   (c) a control plate annularly disposed on the crankshaft and which engages the threaded portion of the crankshaft;
   (d) a plurality of hydraulic cylinders having piston rods connected with the control plate; and
   (e) means for inducing rotation of said crankshaft and inducing a linear movement of said control plate along a portion of the length of the crankshaft which moves the connected piston rods within the hydraulic cylinders to thereby provide fluid communication with remote hydraulic actuators.

18. An apparatus as recited in claim 17, wherein the means for inducing rotation of said crankshaft comprises a crank arm with an attached handle, said crank arm in mechanical connection with said crankshaft such that turning of the handle induces rotation of said crankshaft.

19. An apparatus as recited in claim 18, wherein the crank arm is directly attached with the crankshaft to form said mechanical connection and the crank arm thereby rotates with the crankshaft.

20. An apparatus for adjusting the position of a conveyor guide rail to accommodate various product packages, comprising:
   (a) a hydraulic actuator cylinder having a piston configured for mechanical connection with a guide rail assembly; and
   (b) a guide rail control device, said guide rail control device comprising
      (i) a housing,
      (ii) a crankshaft rotatably retained within said housing, said crankshaft including a portion having exterior threads,
      (iii) a control plate annularly disposed on the crankshaft which engages the threaded portion of the crankshaft,
      (iv) a plurality of hydraulic cylinders having piston rods connected with the control plate, and
      (v) means for inducing rotation of said crankshaft, said rotation inducing a linear movement of said control plate along a portion of the length of the crankshaft which moves the connected piston rods within the hydraulic cylinders to thereby provide fluid communication with hydraulic actuators whose resultant piston movement causes the guide rail assembly to move from said first position to said second position.

21. A method of remotely adjusting the position of conveyor guide rails which direct the positioning of product packages as they move along a conveyor, comprising the steps of:
   (a) moving a control member of a guide rail control device which is configured to communicate fluid;
   (b) receiving within an actuator said communicated fluid which thereby causes movement of an output portion of said actuator; and
   (c) adjusting the position of a guide rail assembly in response to mechanically coupled movement of the output portion of said actuator.

22. A hydraulic control for providing simultaneous fluid communication with multiple remote hydraulic actuators, comprising:
   (a) a housing;
   (b) a crankshaft rotatably retained within said housing, said crankshaft including a portion having exterior threads;
   (c) a control plate annularly disposed on the crankshaft which engages the threaded portion of the crankshaft;
   (d) hydraulic cylinders whose piston rods are connected with the control plate; and
   (e) means for inducing rotation of said crankshaft, said rotation inducing a linear movement of said control plate along a portion of the length of the crankshaft which moves the connected piston rods within the hydraulic cylinders to thereby provide fluid communication with remote hydraulic actuators.

23. A hydraulic control as recited in claim 22, wherein the means for inducing rotation of said crankshaft comprises a crank arm with an attached handle, said crank arm in mechanical connection with said crankshaft such that turning of the handle attached to the crank arm induces rotation of said crankshaft.

24. A hydraulic control as recited in claim 23, wherein the crank arm is directly attached with the crankshaft to form said mechanical connection and the crank arm thereby rotates with the crankshaft.

* * * * *